(12) United States Patent
Choi et al.

(10) Patent No.: US 9,569,371 B2
(45) Date of Patent: Feb. 14, 2017

(54) MEMORY DEVICE, MEMORY SYSTEM, AND OPERATING METHOD OF MEMORY SYSTEM

(71) Applicant: SAMSUNG ELECTRONICS CO., LTD., Suwon-si, Gyeonggi-Do (KR)

(72) Inventors: Seong-Hyeog Choi, Hwaseong-si (KR);
Jun-Jin Kong, Yongin-si (KR);
Hong-Rak Son, Anyang-si (KR);
Pil-Sang Yoon, Hwaseong-si (KR);
Chang-Kyu Seol, Osan-si (KR)

(73) Assignee: SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 47 days.

(21) Appl. No.: 14/626,989

(22) Filed: Feb. 20, 2015

(65) Prior Publication Data
US 2015/0363335 A1 Dec. 17, 2015

(30) Foreign Application Priority Data
Jun. 13, 2014 (KR) .................. 10-2014-0072295

(51) Int. Cl.
*H04L 29/06* (2006.01)
*G06F 12/14* (2006.01)
*H04L 9/32* (2006.01)
*G06F 11/30* (2006.01)

(52) U.S. Cl.
CPC ......... *G06F 12/1408* (2013.01); *H04L 9/3278* (2013.01); *G06F 2212/1052* (2013.01)

(58) Field of Classification Search
None
See application file for complete search history.

(56) References Cited

U.S. PATENT DOCUMENTS

| 5,838,613 A | 11/1998 | Takizawa |
| 7,876,894 B2 | 1/2011 | Iyer et al. |
| 2003/0081774 A1* | 5/2003 | Lin ................... H04L 9/0838 380/44 |
| 2003/0084304 A1* | 5/2003 | Hon ................... G06Q 20/367 713/185 |

(Continued)

FOREIGN PATENT DOCUMENTS

| JP | 05-002478 | 1/1993 |
| JP | 2005-209108 | 8/2005 |

(Continued)

*Primary Examiner* — Shin-Hon Chen
(74) *Attorney, Agent, or Firm* — F. Chau & Associates, LLC

(57) ABSTRACT

A memory device, a memory system, and an operating method of the memory system is provided. The operating method includes operations of transmitting an authentication request to a memory device using a memory controller; converting the authentication request to a first address using the memory device; processing authentication data that corresponds to the first address and indicates a physical characteristic of the memory device and transmitting the authentication data as an authentication response to the authentication request to the memory controller using the memory device; and verifying whether the authentication response received from the memory device is an authentication response to the authentication request using the memory controller.

15 Claims, 16 Drawing Sheets

(56) References Cited

U.S. PATENT DOCUMENTS

| | | | |
|---|---|---|---|
| 2004/0015692 A1* | 1/2004 | Green | H04L 63/0823 713/169 |
| 2005/0149740 A1* | 7/2005 | Kotzin | H04W 12/06 713/185 |
| 2008/0077795 A1* | 3/2008 | MacMillan | H04L 9/3228 713/169 |
| 2009/0083833 A1* | 3/2009 | Ziola | G06F 21/31 726/2 |
| 2010/0017602 A1* | 1/2010 | Bussard | H04L 9/0844 713/168 |
| 2011/0010547 A1* | 1/2011 | Noda | G06F 21/445 713/168 |
| 2012/0066571 A1 | 3/2012 | Marinet | |
| 2012/0079289 A1 | 3/2012 | Weng et al. | |
| 2012/0131340 A1* | 5/2012 | Teuwen | H04L 9/3278 713/168 |
| 2012/0304281 A1 | 11/2012 | Kang et al. | |
| 2013/0010957 A1 | 1/2013 | Yu et al. | |
| 2013/0156183 A1 | 6/2013 | Komano et al. | |
| 2013/0291071 A1* | 10/2013 | Blom | H04L 9/0833 726/4 |
| 2014/0165141 A1* | 6/2014 | Chellappa | G06F 21/44 726/2 |
| 2015/0269378 A1* | 9/2015 | Falk | H04L 9/3278 726/6 |
| 2015/0278505 A1* | 10/2015 | Lu | H04L 9/0866 726/19 |

FOREIGN PATENT DOCUMENTS

| | | |
|---|---|---|
| JP | 2009-528992 | 11/2009 |
| JP | 2011-128663 | 6/2011 |
| JP | 2012-064222 | 3/2012 |
| KR | 10-2008-0088911 | 10/2008 |

\* cited by examiner

MEMORY DEVICE, MEMORY SYSTEM, AND OPERATING METHOD OF MEMORY SYSTEM

CROSS-REFERENCE TO RELATED APPLICATION

This application claims priority to and the benefit of Korean Patent Application No. 10-2014-0072295, filed on Jun. 13, 2014, in the Korean Intellectual Property Office, the entire contents of which are incorporated by reference herein.

BACKGROUND

The present disclosure relates to a memory device, a memory system, and an operating method of the memory system, and more particularly, to a memory device, a memory system, and an operating method of the memory system that allow reliable communication to be performed between the memory device and a memory controller.

Due to development of the Internet and networks, security at a random device has become important. In particular, since personal information and financial transactions are frequently done through the Internet and networks, there is a need to protect access to a memory device that stores various types of information.

SUMMARY

According to exemplary embodiments of the inventive concept, there is provided an operating method of a memory system. The operating method includes operations of transmitting an authentication request to a memory device using a memory controller; converting the authentication request to a first address using the memory device; processing authentication data that corresponds to the first address and indicates a physical characteristic of the memory device and transmitting the authentication data as an authentication response to the authentication request to the memory controller using the memory device; and verifying whether the authentication response received from the memory device is an authentication response to the authentication request using a memory controller.

The operation of verifying may include operations of converting the authentication request to the first address using the memory controller and comparing set data that is set for the first address with the authentication data that is extracted from the authentication response transmitted from the memory device using the memory controller.

Each of the memory controller and the memory device may convert the authentication request to the first address using an address generator that equally generates the first address with respect to the authentication request.

The operation of verifying may include operations of searching for the first address that is mapped to the authentication request using the memory controller; and comparing set data that is set for the first address with the authentication data that is extracted from the authentication response transmitted from the memory device using the memory controller.

The operating method may further include, between the operation of processing and the operation of transmitting, an operation of encrypting the authentication data and generating the encrypted authentication data as the authentication response.

The operating method may further include operations of exchanging a Number Used Once (nonce) between the memory controller and the memory device; and setting the authentication request that corresponds to the nonce using the memory controller.

If it is verified that the authentication response is the authentication response to the authentication request, the operating method may further include an operation of permitting normal access to the memory device.

The operation of permitting the normal access may include operations of encrypting a second address for the normal access to the memory device using the memory controller; decrypting the encrypted second address using the memory device; and performing a normal operation on the decrypted second address using the memory device.

The operation of encrypting and the operation of decrypting are performed using the authentication response as a secret key.

The memory device may include a NAND flash memory device.

The memory system may include a solid state drive (SSD).

According to another aspect of the inventive concept, there is provided an operating method of a memory system, the operating method including operations of exchanging a Number Used Once (nonce) between a memory controller and a memory device; generating a challenge using the nonce by each of the memory controller and the memory device; converting the challenge to a first address using the memory device; reading authentication data that corresponds to the first address and indicates a physical characteristic of the memory device using the memory device; transmitting a response corresponding to the challenge to the memory device using the memory controller; and comparing the authentication data with the response received from the memory controller and verifying whether the response received from the memory controller is a response that forms a challenge-response pair with the challenge using the memory device.

The operation of transmitting may include operations of searching for the response that is mapped to the challenge using the memory controller; and transmitting the response to the memory device.

When the response received from the memory controller is the response that forms the challenge-response pair with the challenge, the operating method may further include an operation of permitting normal access to the memory device.

The operation of permitting normal access may include operations of encrypting a second address for the normal access to the memory device, using the response as a secret key and using the memory controller; decrypting the encrypted second address using the response as a secret key using the memory device; and performing a normal operation on the decrypted second address using the memory device.

BRIEF DESCRIPTION OF THE DRAWINGS

Exemplary embodiments of the inventive concept will be more clearly understood from the following detailed description taken in conjunction with the accompanying drawings in which.

DETAILED DESCRIPTION OF THE EMBODIMENTS

Figure 1:
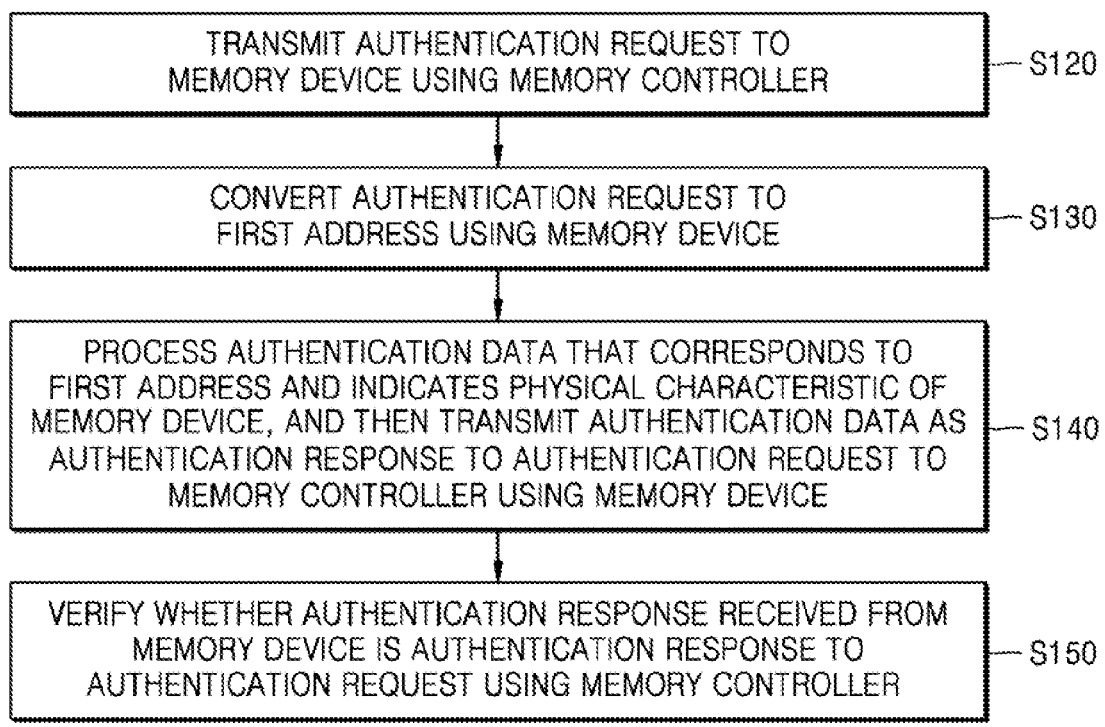
FIG. 1 is a flowchart of an operating method of a memory system according to an exemplary embodiment of the inventive concept.

The present inventive concept will now be described more fully with reference to the accompanying drawings, in which exemplary embodiments of the inventive concept are shown. The inventive concept may, however, be embodied in many different forms, and should not be construed as being limited to the embodiments set forth herein. Thus, the inventive concept may include all revisions, equivalents, or substitutions which are included in the concept and the technical scope related to the present inventive concept. Like reference numerals in the drawings denote like elements. In the drawings, the dimension of structures may be exaggerated for clarity.

Furthermore, all examples and conditional language recited herein are to be construed as being without limitation to such specifically recited examples and conditions. Throughout the specification, a singular form may include plural forms, unless there is a particular description contrary thereto. Also, terms such as "comprise" or "comprising" are used to specify existence of a recited form, a number, a process, an operation, a component, and/or groups thereof, not excluding the existence of one or more other recited forms, one or more other numbers, one or more other processes, one or more other operations, one or more other components and/or groups thereof.

Unless expressly described otherwise, all terms including descriptive or technical terms which are used herein should be construed as having meanings that are familiar to ones of ordinary skill in the art. Also, terms that are defined in a general dictionary and that are used in the following description should be construed as having meanings that are equivalent to meanings used in the related description, and unless expressly described otherwise herein, the terms should not be construed as being ideal or excessively formal.

As used herein, the term "and/or" includes any and all combinations of one or more of the associated listed items.

In an embodiment of the present inventive concept, a three dimensional (3D) memory array is provided. The 3D memory array is monolithically formed in one or more physical levels of arrays of memory cells having an active area disposed above a silicon substrate and circuitry associated with the operation of those memory cells, whether such associated circuitry is above or within such substrate. The term "monolithic" means that layers of each level of the array are directly deposited on the layers of each underlying level of the array.

In an embodiment of the present inventive concept, the 3D memory array includes vertical NAND strings that are vertically oriented such that at least one memory cell is located over another memory cell. The at least one memory cell may comprise a charge trap layer.

The following patent documents, which are hereby incorporated by reference, describe suitable configurations for three-dimensional memory arrays, in which the three-dimensional memory array is configured as a plurality of levels, with word lines and/or bit lines shared between levels: U.S. Pat. Nos. 7,679,133; 8,553,466; 8,654,587; 8,559,235; and U.S. Pat. Pub. No. 2011/0233648.

FIG. 1 is a flowchart of an operating method of a memory system according to an exemplary embodiment of the inventive concept. Referring to FIG. 1, the operating method of the memory system is depicted., An authentication request is transmitted to a memory device using a memory controller (operation S120). The authentication request is converted to a first address using the memory device (operation S130). Authentication data that corresponds to the first address and that indicates a physical characteristic of the memory device is processed using the memory device, and then the authentication data is then transmitted as an authentication response to the authentication request to the memory controller using the memory device (operation S140). Whether the authentication response received from the memory device is an authentication response to the authentication request is verified using the memory controller (operation S150).

Figure 2:
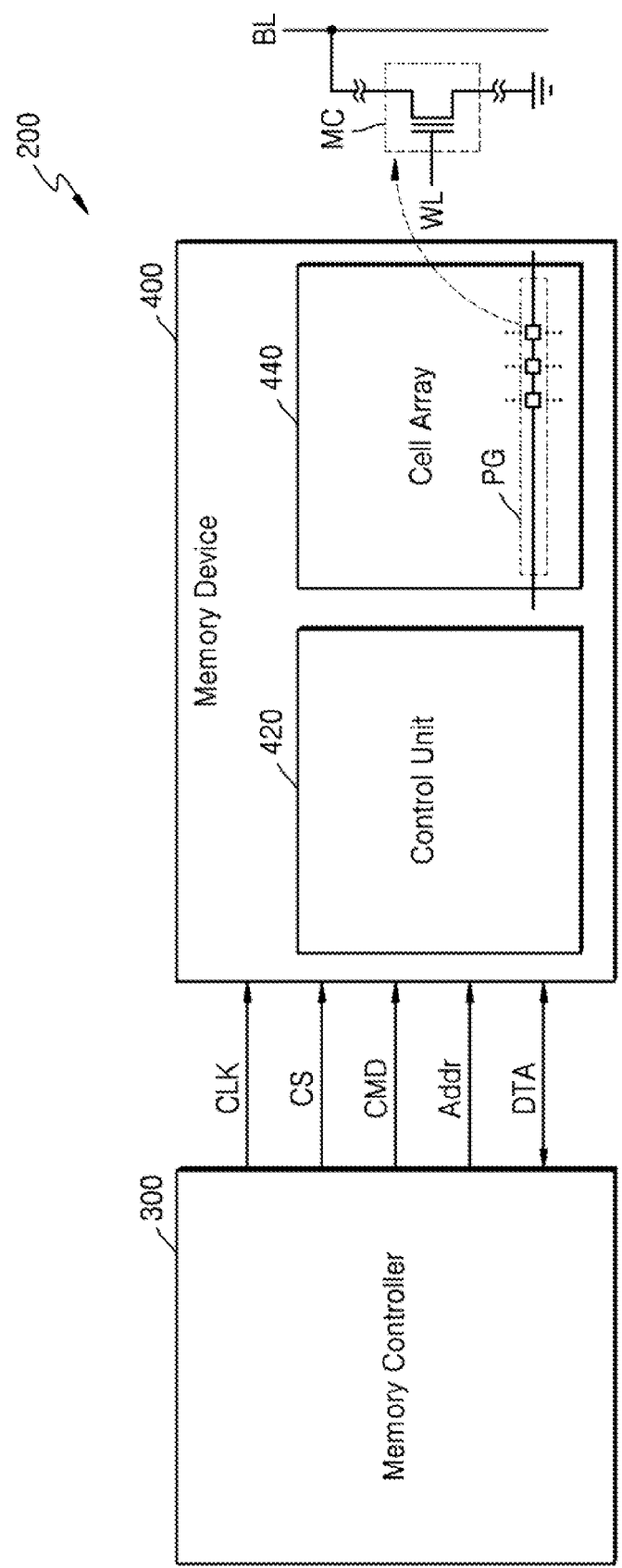
FIG. 2 is a diagram of the memory system in which the operating method of FIG. 1 may be performed, according to an exemplary embodiment of the inventive concept.

FIG. 2 is a diagram of a memory system 200 in which the operating method of FIG. 1 may be performed, according to an exemplary embodiment of the inventive concept. The memory system 200 includes a memory controller 300 and a memory device 400. The memory controller 300 provides various signals to the memory device 400 and thus controls a memory operation. For example, the memory controller 300 provides a clock signal CLK, a chip selection signal CS, a command CMD, or an address Addr to the memory device 400. Data DTA for a write operation and a read operation is exchanged between the memory controller 300 and the memory device 400.

The memory device 400 may receive the clock signal CLK, the chip selection signal CS, the command CMD, or the address Addr from the memory controller 300 and may exchange the data DTA with the memory controller 300. The memory device 400 may include a cell array 440 and a control logic 420. The cell array 440 may include a plurality of memory cells MC that may be accessed by wordlines WL and bitlines BL.

The memory device 400 of FIG. 2 may be a flash memory device, e.g., a NAND flash memory device. In this case, each of the memory cells MC may include a floating gate transistor, and memory cells that are connected to the same wordline WL are designated a page PG. Each of the memory cells MC may be a memory unit that may transition between at least two states, each of which corresponds to data. Also, each of the memory cells MC may maintain its state although a power supply to the memory device 400 is discontinued, so that each of the memory cells MC may retain programmed data. Hereinafter, it is assumed that the memory device 400 is a NAND flash memory device, but exemplary embodiments are not limited thereto.

The control logic 420 may be synchronized with the clock signal CLK received from the memory controller 300 and thus can perform an operation with respect to the cell array 440 according to the command CMD, the address Addr, or the data DTA. In order to perform the operation, although not illustrated in FIG. 2, the memory device 400 may further include a decoder (not shown) that selects a memory cell MC corresponding to the address Addr, a driver (not shown) that applies an operating voltage to a wordline WL so as to perform the operation according to the command CMD on the selected memory cell MC, a voltage generator (not shown) that generates the operating voltage, a data input/output (I/O) unit (not shown) that transmits or receives the data DTA, or the like.

Figure 3:
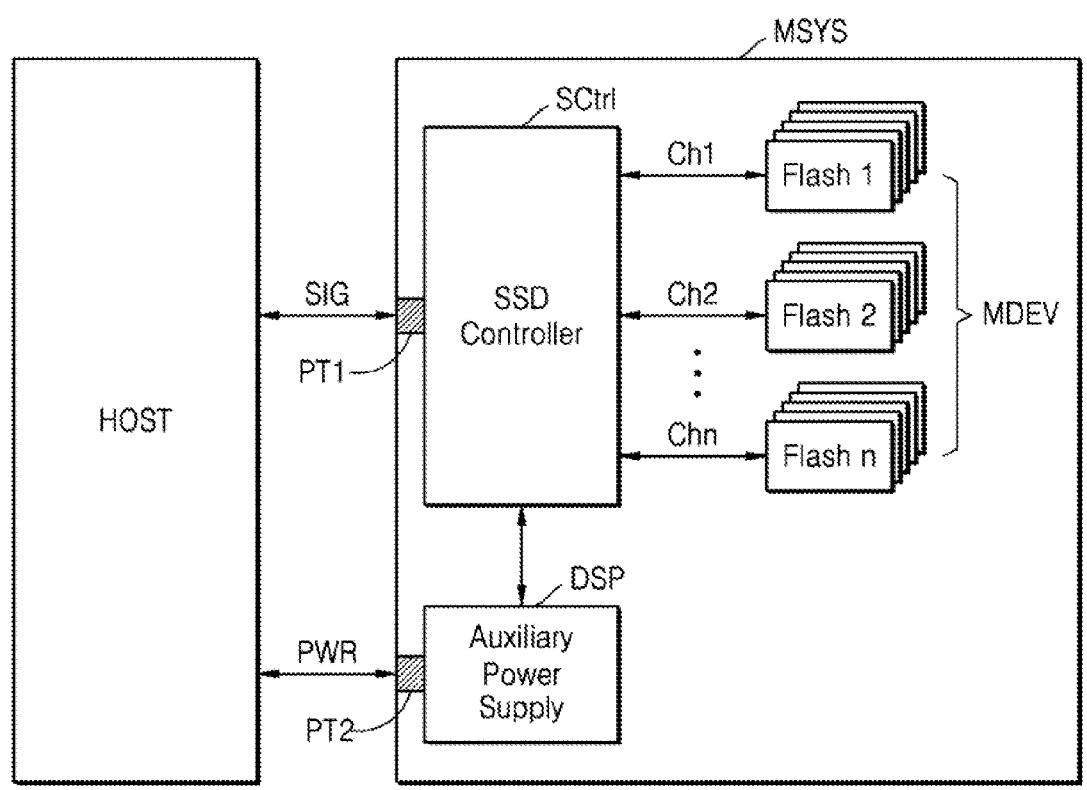
FIG. 3 is a diagram of the memory system of FIG. 2, according to an exemplary embodiment of the inventive concept.

When the memory device 400 of FIG. 2 is a flash memory, e.g., a NAND flash memory device, as shown in the memory system MSYS of FIG. 3 that illustrates an example of the memory system 200 of FIG. 2, the memory system may be embodied as a solid state drive (SSD). Referring to FIG. 3, the SSD MSYS includes an SSD controller SCtr1 and one or more flash memory devices MDEV. In response to a signal SIG received from a host device HOST via a first port PT1 of the SSD MSYS, the SSD controller SCtr1 controls the flash memory devices MDEV. The SSD controller SCtr1 may be connected to the flash memory devices MDEV via a plurality of channels Ch1 through Chn. The SSD MSYS may further include an auxiliary power supply device DSP and thus may receive power PWR from the host device HOST via a second port PT2. However, exemplary embodiments are not limited thereto, and, the SSD MSYS may receive power from an external device other than the host device HOST. The SSD MSYS may output via the first port PT1 a result SIG that is obtained by processing a request from the host device HOST.

However, due to development of the Internet and networks, security at a random device has become important. In particular, since personal information and financial transactions are frequently done through the Internet and networks, there is a need to control access to a memory device that stores various types of information. Here, it is required to control direct access to the memory device 400 or indirect access using another memory device 400. For example, an intruder could directly attack the flash memory device Flash1 connected to the channel 1 Ch1 of FIG. 3, or could attack the flash memory device Flash1 via the flash memory device Flash2 connected to the channel 2 Ch2 of FIG. 3. In order to prevent the former case, the memory device 400 may only permit access by the authenticated memory controller 300. In order to prevent the latter case, the memory controller 300 may only perform a control on the authenticated memory device 400. This is because the memory controller 300 may be copied by an unauthenticated memory device.

Thus, in order to prevent copying of the memory controller 300, the memory controller 300 may perform an authentication operation on the memory device 400 other than the security of information stored in the memory device 400. Furthermore, in order to guarantee a quality of the memory system 200, the memory controller 300 may perform the authentication operation on the memory device 400. For example, in the SSD MSYS of FIG. 3, the SSD controller SCtr1 may perform the authentication operation on the one or more flash memory devices MDEV so as to verify whether each of the SSD controller SCtr1 and the one or more flash memory devices MDEV is manufactured by the same manufacturer or mutually-authenticated manufacturers. However, exemplary embodiments are not limited thereto, and the memory device 400 may also perform an authentication operation on the memory controller 300 so as to guarantee the quality of the memory system 200. That is, according to various requests, it is requested to perform an authentication with respect to a right to access the memory controller 300 and the memory device 400.

Figure 4A:
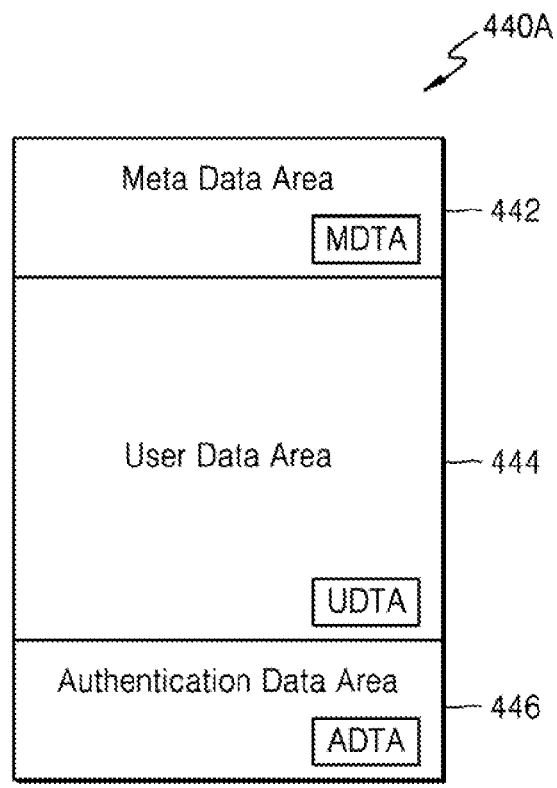
FIGS. 4A and 4B illustrate a cell array of a memory device of FIG. 2, according to exemplary embodiments of the inventive concept.

FIG. 4A illustrates a cell array 440A of the memory device 200 of FIG. 2, according to an exemplary embodiment of the inventive concept. Referring to FIGS. 2 and 4A, the cell array 440A may include a metadata area 442, a user data area 444, and an authentication data area 446. Positions and relative sizes of the metadata area 442, the user data area 444, and the authentication data area 446 are not limited to FIG. 4A. The metadata area 442 may include various types of metadata MDTA for operations of the memory device 400. For example, when the memory device 400 is a flash memory device, an initial read voltage level, a program/erase cycle (P/E cycle), or mapping information about a log block and a data block may be stored as the metadata MDTA in the metadata area 442. The user data area 444 may store user data UDTA that is programmed according to a user's request.

Authentication data ADTA may be generated using the authentication data area 446. The authentication data ADTA may be generated in a manner that a memory cell is programmed using a voltage and then is read using a particular voltage. The voltage for programming the memory cell and the voltage for reading the memory cell during generation of the authentication data ADTA may be different from voltages for program and read operations for the user data UDTA. The authentication data ADTA indicates a physical characteristic of the memory device 400 and thus functions as a unique identifier of the memory device 400. In other words, like a finger print or a personal identifier of a person, the authentication data ADTA indicates a unique characteristic of the memory device 400 due to physical deviations during a manufacturing process. For example, even when memory cells of the authentication data area 446 are programmed using the same voltage, a threshold voltage distribution of the differently programmed memory cells varies in the one or more flash memory devices MDEV. Thus, when the memory cells of the authentication data area 446 are read using a random read voltage, different types of authentication data are read from the one or more flash memory devices MDEV. For example, when the flash memory device Flash1 of the channel 1 Ch1 and the flash memory device Flash2 of the channel 2 Ch2 of FIG. 3 are programmed with the same program voltage, if the flash memory device Flash1 and the flash memory device Flash2 are read for authentication data, authentication data read from the flash memory device Flash1 is different from authentication data read from the flash memory device Flash2.

The size of the authentication data ADTA may be variously set according to a security level requested by the memory device 400 or the memory system 200, and a level of an allocable resource. For example, the authentication data ADTA may have a size that is equal to a size of a page or a size obtained by dividing the page by N. Alternatively, the authentication data ADTA may be set to have a size of a block. When the authentication data area 446 is set with a size in which one or more pieces of the authentication data ADTA may be stored, similar to the authentication data ADTA, the size of the authentication data area 446 may be variously set according to the security level requested by the memory device 400 or the memory system 200, and the level of the allocable resource.

Figure 4B:
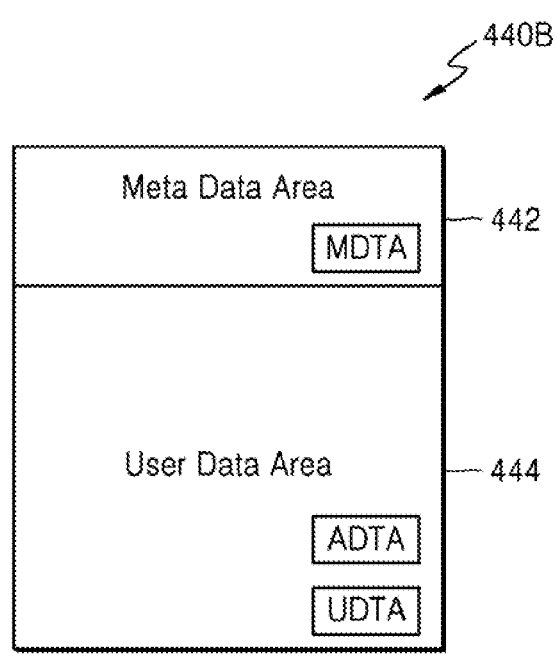

FIG. 4B illustrates the cell array 440B of the memory device 200 of FIG. 2, according to another embodiment of the inventive concept. Referring to FIGS. 2 and 4B, the cell array 440B may include a metadata area 442 and a user data area 444. Similar to the metadata area 442 of FIG. 4A, the metadata area 442 of FIG. 4B may include various types of metadata MDTA for operations of the memory device 400. Similarly, the user data area 444 of FIG. 4B may store user data UDTA that is programmed according to a user's request. However, the cell array 440B of FIG. 4B may not allocate a separate space to authentication data ADTA but may generate authentication data ADTA from the user data area 444. That is, an address that corresponds to an authentication request may indicate the user data area 444. As described above, the authentication data ADTA may be generated via program and read operations with respect to the address.

When the memory system 200 is turned on or the memory device 400 is connected to the memory controller 300, or if required, an authentication operation may be performed between the memory controller 300 and the memory device 400. In the present embodiment, the memory system 200 may operate as described in the method of FIG. 1, and thus may perform the authentication operation.

Figure 5:
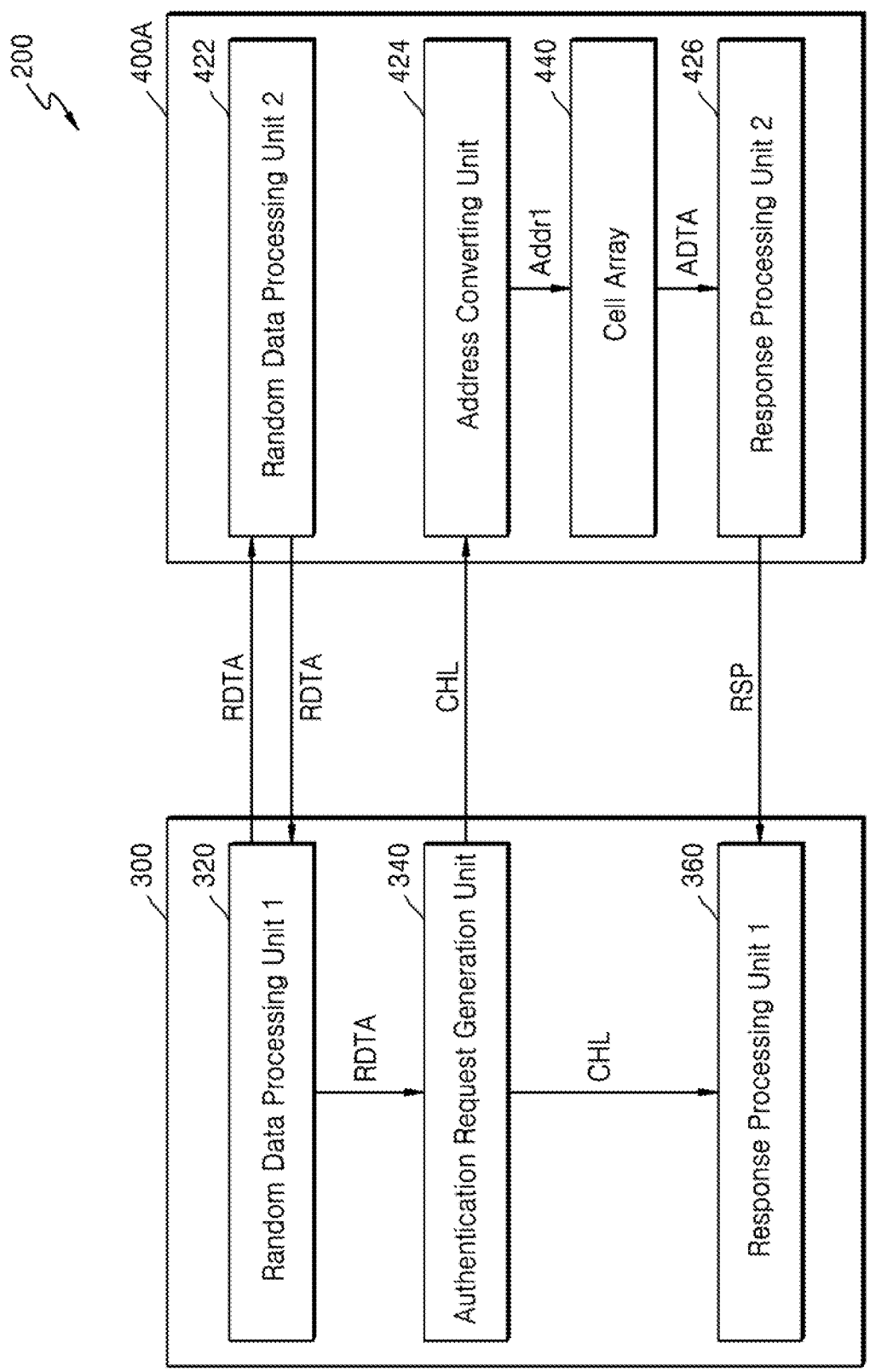
FIG. 5 illustrates the memory system of FIG. 2, in which an authentication operation is performed using the operating method of FIG. 1.

FIG. 5 illustrates the memory system 200 of FIG. 2 in which an authentication operation is performed using the operating method of FIG. 1. Referring to FIGS. 1 and 5, the memory controller 300 may include a first random data processing unit 320, an authentication request generation unit 340, and a first authentication response processing unit 360. The memory device 400A may include a second random data processing unit 422, an address converting unit 424, a cell array 440, and a second authentication response processing unit 426. The second random data processing unit 422, the address converting unit 424, and the second authentication response processing unit 426 of the memory device 400 may be included in the control logic 420 of FIG. 2. Alternatively, the second random data processing unit 422, the address converting unit 424, and the second authentication response processing unit 426 of the memory device 400A may be arranged separately from the control logic 420 of FIG. 2. The cell array 440 of the memory device 400A may be the same as the cell array 440 of FIG. 2.

The first random data processing unit 320 of the memory controller 300 may generate and transmit random data RDTA to the memory device 400. The second random data processing unit 422 of the memory device 400 may generate and transmit random data RDTA to the memory controller 300. Since random data is exchanged between the memory controller 300 and the memory device 400A, a challenge, i.e., an authentication request, by an unauthorized memory controller or memory device may not be generated. The random data RDTA may be a Number Used Once (nonce) that is a random number used in authentication so as to ensure that old communication cannot be reused in replay attacks.

The first random data processing unit 320 may transmit the random data RDTA to the authentication request generation unit 340. The authentication request generation unit 340 generates an authentication request CHL corresponding to the random data RDTA and transmits the authentication request CHL to the memory device 400A (operation S120). For example, the authentication request generation unit 340 may generate the authentication request CHL using the random data RDTA. An address converting unit 424 of the memory device 400A converts the authentication request CHL to a first address Addr1 (operation S130). The first address Addr1 may indicate a part or all of the authentication data area 446 of FIG. 4A. Alternatively, the first address Addr1 may indicate a part or all of the user data area 444 of FIG. 4B. According to a control by the control logic 420 of FIG. 2, authentication data ADTA that is stored at the first address Addr1 and indicates a physical characteristic of the memory device 400A may be read.

The second authentication response processing unit 426 of the memory device 400A processes and transmits the authentication data ADTA as an authentication response RSP to the authentication request CHL to the memory controller 300 (operation S140). The second authentication response processing unit 426 may apply a header to the authentication data ADTA and thus may process the authentication data ADTA as the authentication response RSP. Alternatively, the second authentication response processing unit 426 may encrypt the authentication data ADTA or may perform error correction on the authentication data ADTA, and then may output the authentication data ADTA as the authentication response RSP. The first authentication response processing unit 360 of the memory controller 300 may verify whether the authentication response RSP corresponds to an authentication response RSP that is set with respect to the authentication request CHL (operation S150), so that whether authentication between the memory controller 300 and the memory device 400A is set may be verified.

The authentication request CHL and the authentication response RSP of FIG. 5 may be transmitted as the data DTA of FIG. 2 between the memory controller 300 and the memory device 400A. Also, in order to perform the aforementioned operations, various control signals CS of FIG. 2 may be transmitted from the memory controller 300 to the memory device 400A. For example, the memory controller 300 may transmit a control signal CS indicating an authentication mode, not a normal mode, to the memory device 400A and thus may control the address converting unit 424 of the memory device 400A to be activated in response to the authentication request CHL.

Figure 6:
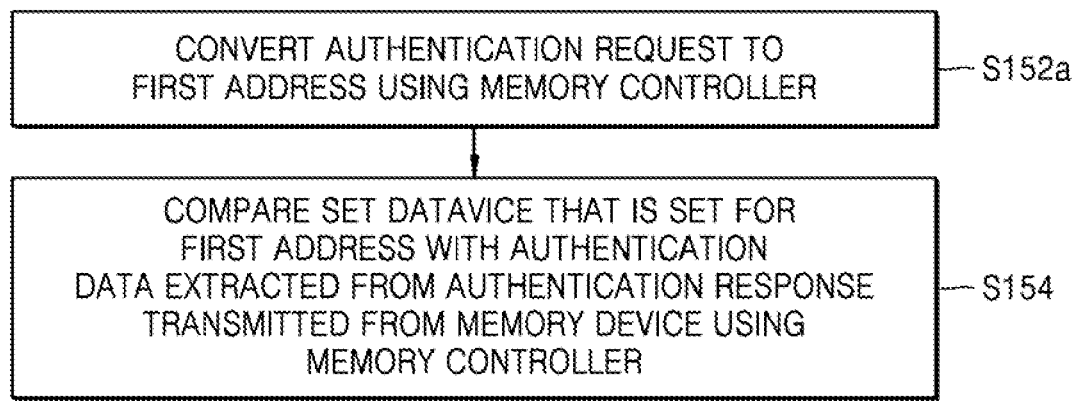
FIG. 6 illustrates the operation of FIG. 1 of verifying whether an authentication response received from a memory device of FIG. 1 is an authentication response to an authentication request, according to an exemplary embodiment of the inventive concept.
Figure 7:
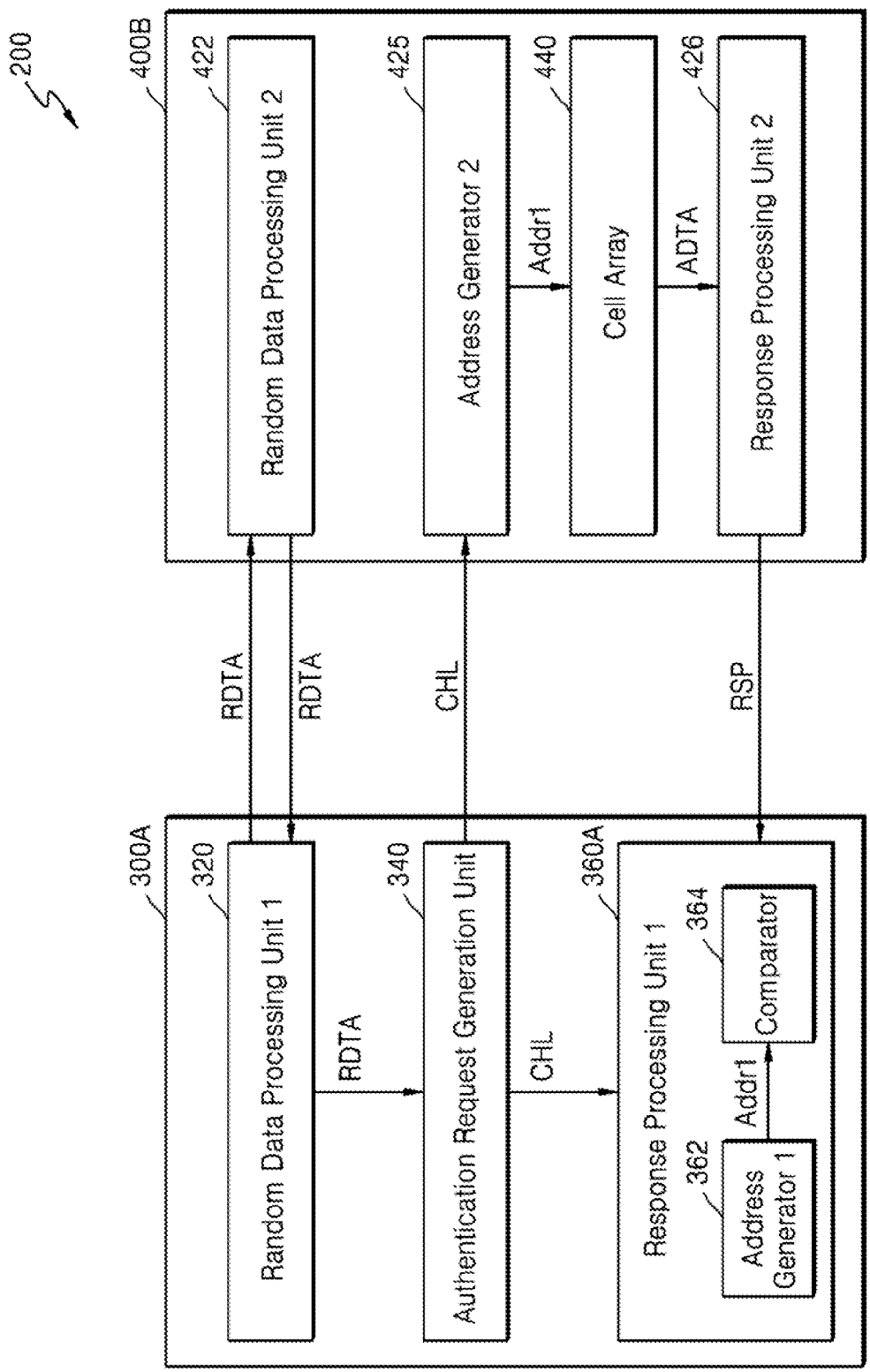
FIG. 7 illustrates the memory system that operates with the verifying method of FIG. 6, according to an exemplary embodiment of the inventive concept.

FIG. 6 illustrates operation S150 of FIG. 1 of verifying whether an authentication response received from a memory device 400B is an authentication response to an authentication request, according to an exemplary embodiment of the inventive concept. FIG. 7 illustrates the memory system 200 that operates with the verifying method of FIG. 6, according to an exemplary embodiment of the inventive concept. Referring to FIGS. 6 and 7, operation S150 of verifying whether the authentication response RSP received from the memory device 400B is the authentication response that is set with respect to the authentication request CHL may include operation S152a of converting the authentication request CHL to the first address Addr1 using the memory controller 300, and operation S154 of comparing set data that is set for the first address Addr1 with the authentication data ADTA that is extracted from the authentication response RSP transmitted from the memory device 400B using the memory controller 300. To do so, the first authentication response processing unit 360 of the memory controller 300 may include a first address generator 362 and a comparator 364. The first address generator 362 may convert the authentication request CHL to the first address Addr1. The memory device 400B may also convert the authentication request CHL to the first address Addr1 using a second address generator 425. The second address generator 425 may perform the same operations as the address converting unit 424 of FIG. 5.

The first address generator 362, arranged in the memory controller 300A, and the second address generator 425, arranged in the memory device 400B, which have the same structure, may equally operate and thus may generate the same first address Addr1 with respect to the same authentication request CHL. The first address generator 362 and the second address generator 425 may be embodied as a Pseudo Random Number Generator (PRNG) or may operate using a modular function or a hash function and thus may convert the authentication request CHL to the first address Addr1.

The comparator 364 may compare the set data that is set for the first address Addr1 with the authentication data ADTA and thus may output a comparison result. For example, the comparator 364 may extract the set data that is set for the first address Addr1, using mapping information about a relation between the first address Addr1 and the set data or using a function (an algorithm) that sets the relation between the first address Addr1 and the set data. For example, the comparator 364 may perform an XOR operation on the set data and the authentication data ADTA and thus may verify whether they match with each other.

Figure 8:
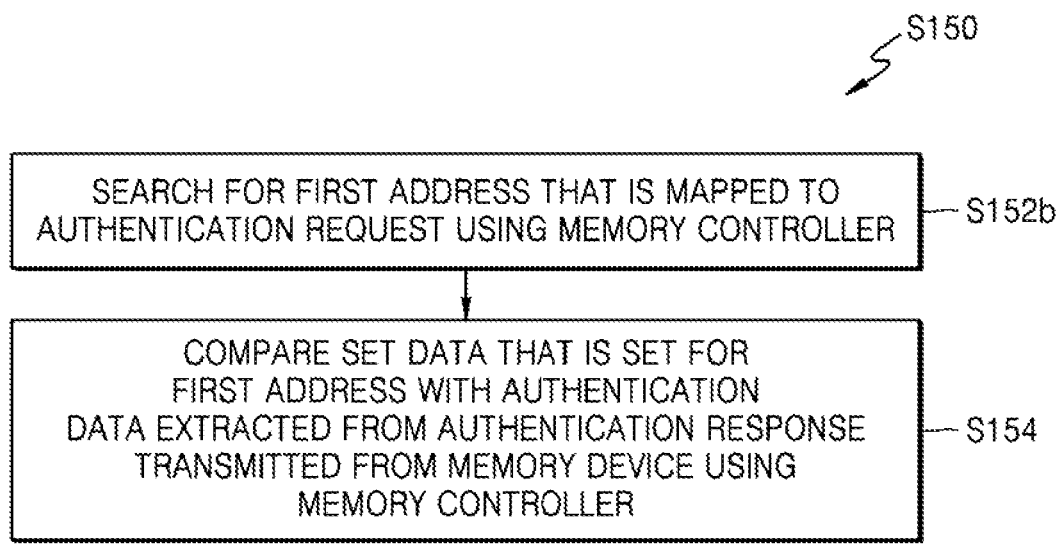
FIG. 8 illustrates the operation of FIG. 1 of verifying whether an authentication response received from the memory device of FIG. 1 is an authentication response to an authentication request, according to another embodiment of the inventive concept.
Figure 9:
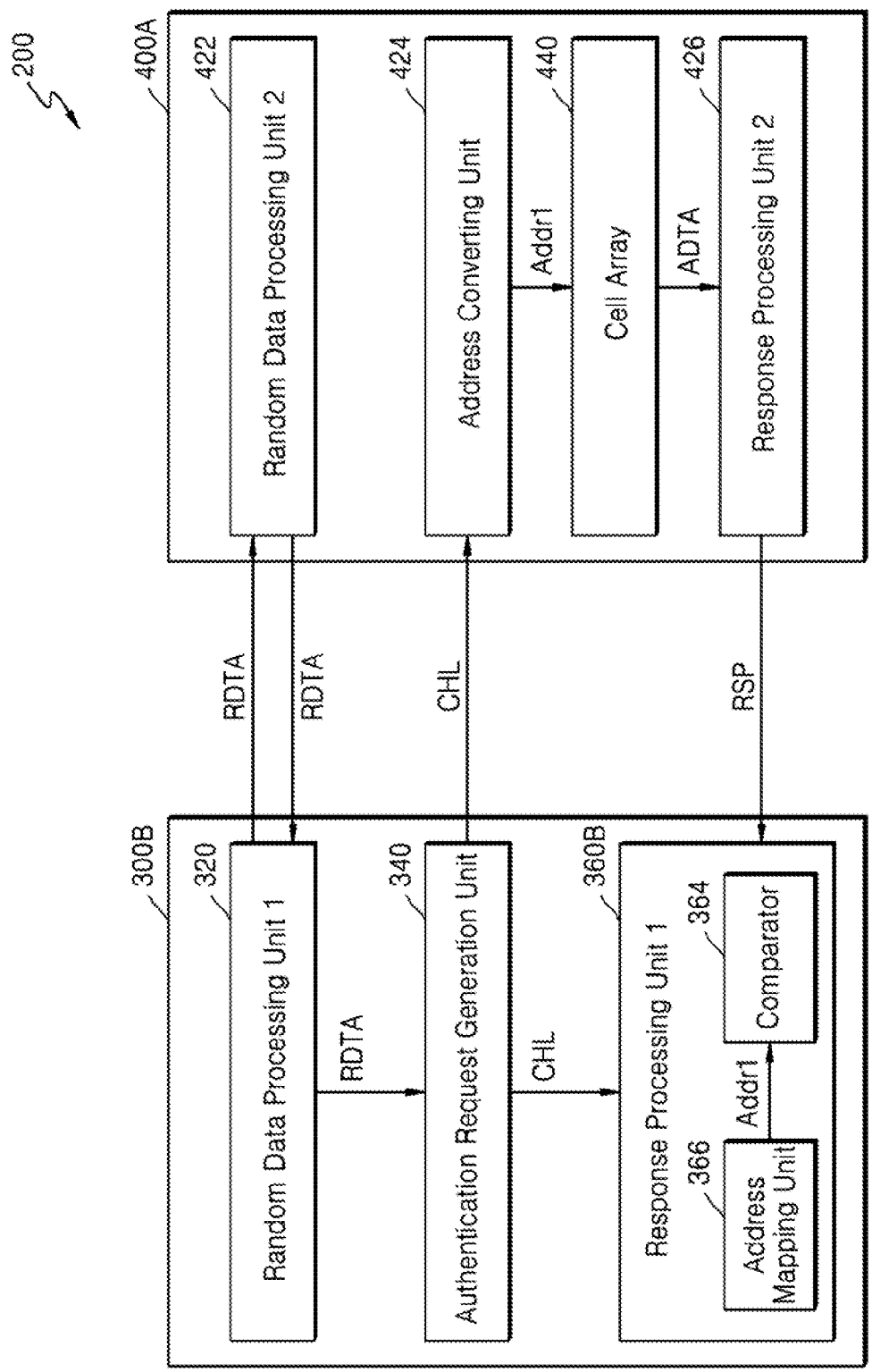
FIG. 9 illustrates the memory system that operates with the verifying method of FIG. 8, according to an exemplary embodiment of the inventive concept.

FIG. 8 illustrates operation S150 of FIG. 1 of verifying whether an authentication response received from the memory device 400 is an authentication response to an authentication request, according to another embodiment of the inventive concept. FIG. 9 illustrates the memory system 200 that operates with the verifying method of FIG. 8, according to an exemplary embodiment of the inventive concept. Referring to FIGS. 8 and 9, operation S150 of verifying whether the authentication response RSP received from the memory device 400A is the authentication response that is set with respect to the authentication request CHL may include operation S152b of searching for the first address Addr1 that is mapped to the authentication request CHL using the memory controller 300, and operation S154 of comparing the set data that is set for the first address Addr1 with the authentication data ADTA that is extracted from the authentication response RSP transmitted from the memory device 400A using the memory controller 300. To do so, the first authentication response processing unit 360 of the memory controller 300B may include an address mapping unit 366 and a comparator 364. The address mapping unit 366 may store the first address Addr1 that corresponds to the authentication request CHL. Since the comparator 364 of FIG. 9 is equal to the comparator 364 of FIG. 7, detailed descriptions thereof are omitted here.

Through the authentication operation, when the memory device and the memory controller according to the exemplary embodiments of the inventive concept perform authentication by generating a unique authentication response to the same authentication request, the memory device and the memory controller may reliably perform the authentication, so that a report of information stored in the memory device 400A, a guarantee of a performance of the memory system 200, or copy prevention of the memory controller 300B may be realized.

Although it has been described that the memory device is authenticated by the memory controller, exemplary embodiments are not limited thereto. That is, the memory controller may be authenticated by the memory device. This is described below.

Figure 10:
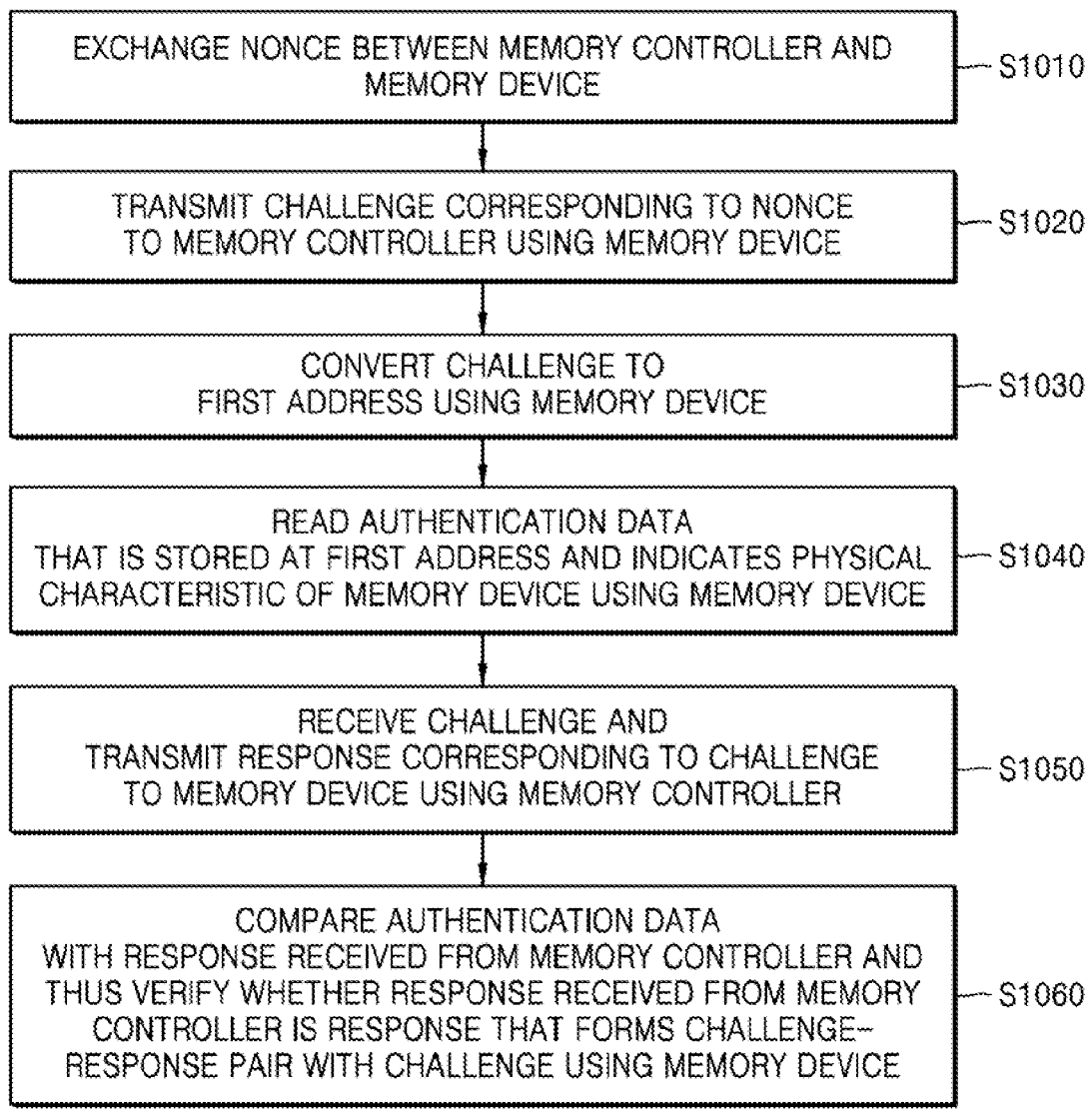
FIG. 10 is a flowchart of an operating method of the memory system, according to another exemplary embodiment of the inventive concept.
Figure 11:
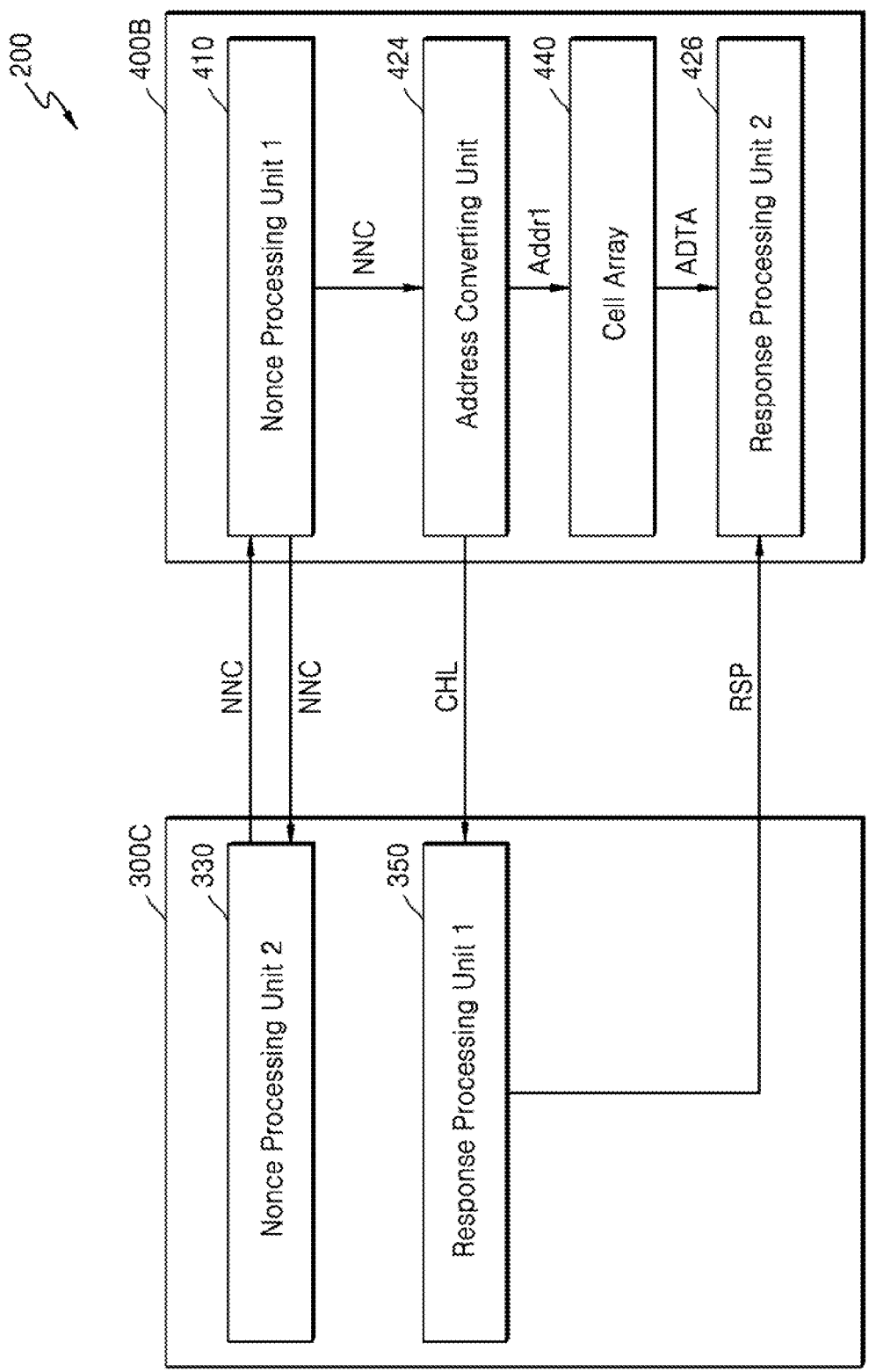
FIG. 11 is a diagram of the memory system in which the operating method of FIG. 10 may be performed, according to another exemplary embodiment of the inventive concept.

FIG. 10 is a flowchart of an operating method of the memory system 200, according to another embodiment of the inventive concept. FIG. 11 is a diagram of a memory system 200 in which the operating method of FIG. 10 may be performed, according to another embodiment of the inventive concept. Referring to FIGS. 10 and 11, the operating method according to the present embodiment may include operations of exchanging a nonce NNC between the memory controller 300C and the memory device 400B (operation S1010); transmitting a challenge CHL corresponding to the nonce NNC to the memory controller 300C using the memory device 400B (operation S1020); converting the challenge CHL to a first address Addr1 using the memory device 400B, (operation S1030); reading authentication data ADTA that is stored at the first address Addr1 and indicates a physical characteristic of the memory device 400B using the memory device 400B (operation S1040); receiving the challenge CHL and transmitting a response RSP corresponding to the challenge CHL to the memory device 400B using the memory controller 300C (operation S1050); and comparing the authentication data ADTA with the response RSP received from the memory controller 300C and thus verifying whether the response RSP received from the memory controller 300C is a response that forms a challenge-response pair with the challenge CHL using the memory device 400B (operation S1060).

Operation S1010 of exchanging the nonce NNC between the memory controller 300C and the memory device 400B may be performed in a manner that a first nonce processing unit 410 of the memory device 400B transmits a first nonce NNC to a second nonce processing unit 330 of the memory controller 300C, and then the second nonce processing unit 330 transmits a nonce NNC corresponding to the first nonce NNC to the memory device 400B. Since the nonce NNC corresponds to the random data RDTA of FIG. 5, detailed descriptions thereof are omitted here.

Since operation S1020 of transmitting using the memory device 400B, the challenge CHL to the memory controller 300C is the same as that is performed by the authentication request generation unit 340 of FIG. 5, further descriptions thereof are omitted here. However, operation S1020 of transmitting, the challenge CHL to the memory controller 300C may be performed by the address converting unit 424 of the memory device 400B using the memory device 400B. As in the aforementioned embodiment, the address converting unit 424 may convert the challenge CHL to the first address Addr1. According to a control by the control logic 420 of FIG. 2, the authentication data ADTA that is stored at the first address Addr1 and indicates the physical characteristic of the memory device 400B may be read.

Operation S1050 of receiving the challenge CHL and transmitting the response RSP corresponding to the challenge CHL to the memory device 400B using the memory controller 300C may be performed by a first response processing unit 350 of the memory controller 300C. For example, the first response processing unit 350 may output the response RSP corresponding to the challenge CHL from a mapping table with respect to the challenge-response pair. Alternatively, the first response processing unit 350 may generate the response RSP corresponding to the challenge CHL, using a function (an algorithm) that defines the challenge-response pair.

The second authentication response processing unit 426 of the memory device 400B may compare the response RSP received from the memory controller 300C with the authentication data ADTA and thus may verify whether the response RSP received from the memory controller 300 is a response that forms the challenge-response pair. If it is verified that the response RSP received from the memory controller 300C is the response that forms the challenge-response pair, the memory controller 300C may be determined as an authenticated memory controller. The comparison between the response RSP and the authentication data ADTA may be performed by performing an XOR operation on the authentication data ADTA and set data that is extracted from the response RSP received from the memory controller 300C.

When the authentication is performed on the memory device 400B or the memory controller 300C via the aforementioned operations, a normal operation may be performed between the memory device 400B and the memory controller 300C that are authenticated.

Referring back to FIG. 2, a normal operation of the memory system 200 is described below. When the memory device 400 is a flash memory device, the normal operation may include a program operation, a read operation, and an erase operation with respect to the flash memory device. Via the program operation, data may be stored in the flash memory device. Here, according to a state available to the memory cell MC of FIG. 2, a size of data to be programmed to the memory cell MC may vary. For example, when the memory cell MC transitions between two states, the memory cell MC may store one bit. On the other hand, when the memory cell MC transitions between four states, the memory cell MC may store two bits. For example, memory cells MC capable of storing one to four bits may be called a single level cell (SLC), a multi level cell (MLC), a triple level cell (TLC), and a quadruple level cell (QLC), respectively.

When the memory cell MC is programmed, electrons may be inserted into a floating gate, and conversely, when the memory cell MC is erased, the electrons that were inserted into the floating gate may be extracted. In order to insert the electrons into the floating gate, a high voltage may be applied to the floating gate. Since gates of the memory cells MC included in one page PG are connected to the same wordline WL, when the memory cell MC is programmed, a high voltage may be uniformly applied to the memory cells MC.

In order to selectively program the memory cells MC included in one page PG, according to program-target data, a voltage to be applied to a bitline BL may be adjusted. The memory cells MC included in one page PG may be connected to different bitlines BL. For example, 0V or 1V may be applied to a bitline BL that is connected to a memory cell MC having a floating gate to which electrons are inserted, whereas a power voltage VDD may be applied to a bitline BL that is connected to a memory cell MC having a floating gate to which insertion of electrons is prevented. The memory cell MC that is connected to the bitline BL to which 0V or 1V is applied may be programmed, and the memory cell MC that is connected to the bitline BL to which the power voltage VDD is applied may be program-inhibited.

The read operation may be similar to the program operation, but voltages that are applied to a bitline BL or a wordline WL, which is connected to a memory cell MC, may be different. Due to an operational characteristic of the flash memory device, a program unit and an erase unit may be different. For example, a data program operation may be performed by a page unit, whereas a data erase operation may be performed by a block unit that is larger than the page unit.

For example, in order to perform the program operation, the memory controller 300 transmits the command CMD, the address Addr, and the data DTA to the memory device 400. For example, in order to perform the read operation, the memory controller 300 transmits the command CMD and the address Addr to the memory device 400, and the memory device 400 transmits read data DTA to the memory controller 300. Here, an intruder may collect the address Addr via a channel. The operating method of the memory device 400 and the memory system 200 may prevent the collection. This is described below.

Figure 12:
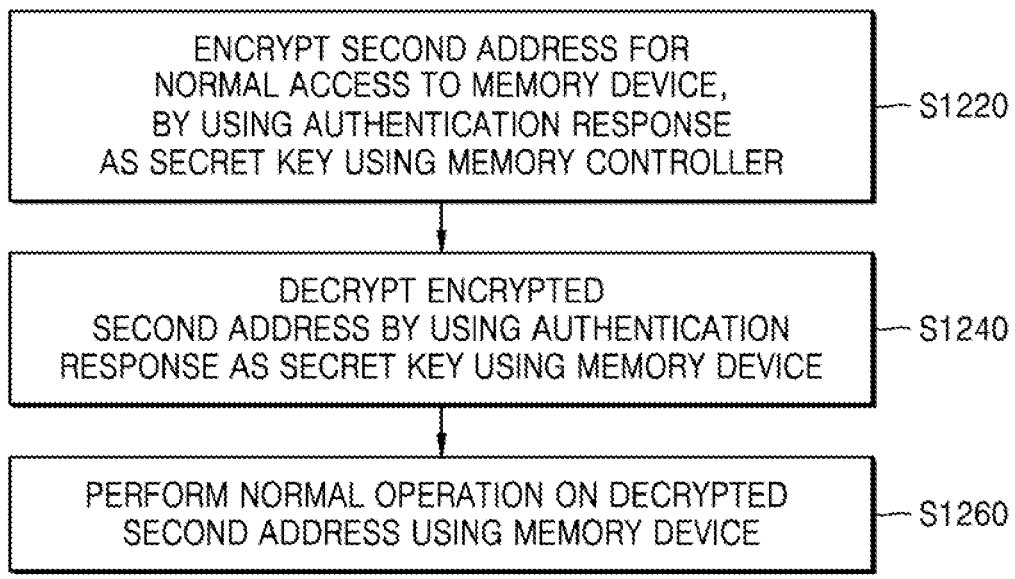
FIG. 12 is a flowchart of a normal operation in the memory system of FIG. 2 in which the operating method of FIG. 1 is performed.

FIG. 12 is a flowchart of a normal operation in the memory system 200 of FIG. 2, in which the operating method of FIG. 1 is performed. Referring to FIGS. 2 and 12, when authentication between the memory controller 300 and the memory device 400 is performed using the operating method of FIG. 1 (operation S150), in order to perform a normal operation, the memory controller 300 may encrypt a second address for normal access to the memory device 400 (operation S1220), the memory device 400 may decrypt the encrypted second address (operation S1240), and the memory device 400 may perform a normal operation on the decrypted second address (operation S1260). Here, the normal access indicates access to the cell array 440 so as to perform a normal operation (i.e., the program operation, the read operation, and the erase operation). In order to perform the encryption and the decryption, each of the memory controller 300 and the memory device 400 may include a crypto engine. For example, the Advanced Encryption Standard (AES) may be used as the crypto engine.

Figure 13:
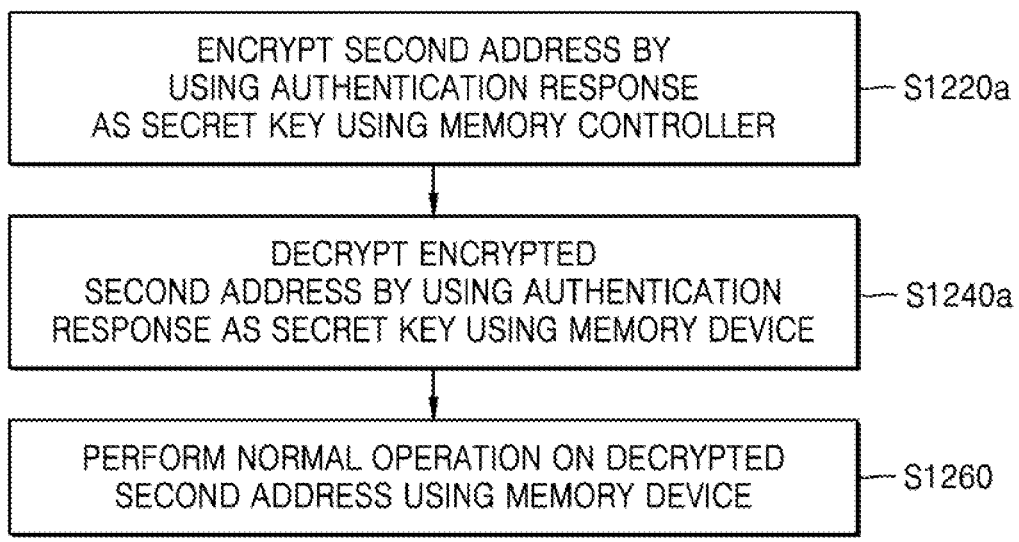
FIGS. 13 and 14 respectively illustrate encryption and decryption of a second address in FIG. 12.
Figure 14:
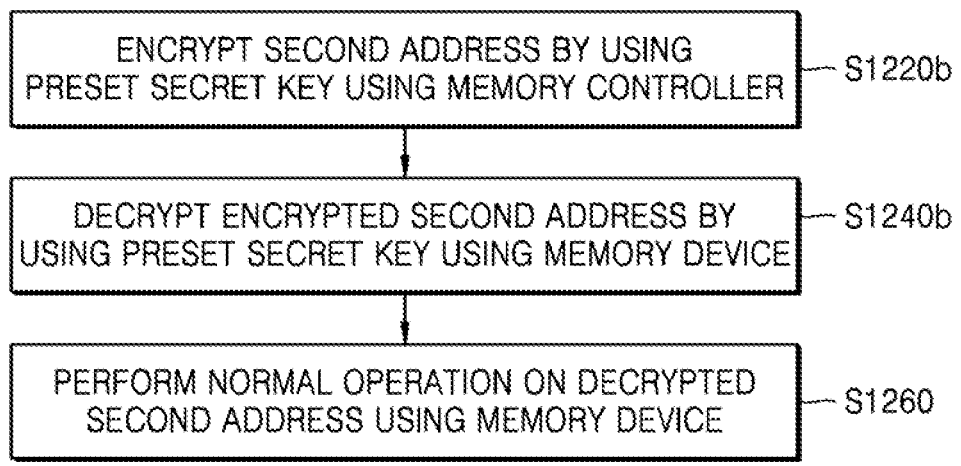

FIGS. 13 and 14 respectively illustrate the encryption and the decryption of the second address described with reference to FIG. 12. Referring to FIG. 13, operation S1220 includes operation S1220a of encrypting the second address using a secret key that is the authentication response used in operation S150 of FIG. 1, and operation S1240a of decrypting the encrypted second address. Thus, it is possible to prevent a waste of time and resources that are required for the memory controller 300 and the memory device 400 to generate, to maintain, and to secure the secret key. However, exemplary embodiments are not limited thereto. As illustrated in FIG. 14, the second address may be encrypted using a preset secret key (operation S1220b), and the encrypted second address may be decrypted (operation S1240b).

Figure 15:
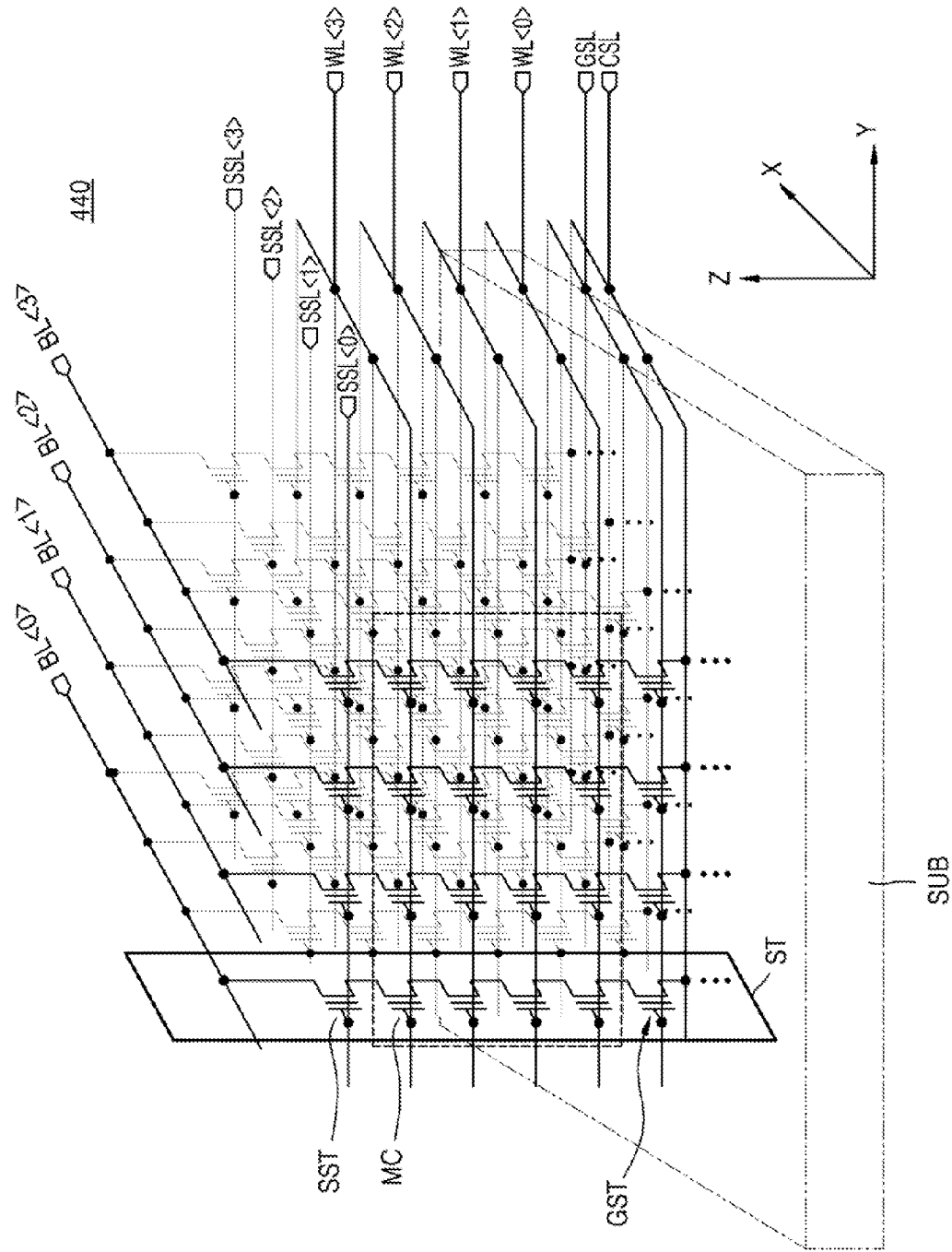
FIG. 15 illustrates the memory device of FIG. 2, according to an exemplary embodiment of the inventive concept.

FIG. 15 illustrates the cell array 440 of FIG. 2, according to an exemplary embodiment of the inventive concept.

The cell array 440 of FIG. 2 may be a two-dimensional NAND flash memory. Alternatively, the cell array 440 of FIG. 2 may be embodied as a vertical NAND flash memory cell array where memory cells are three-dimensionally stacked, as shown in FIG. 15. The cell array 440 as a three-dimensional cell array may include a substrate SUB, a plurality of memory cell strings ST, wordlines WL<0> through WL<3>, and bitlines BL<0> through BL<3>. The memory cell strings ST may extend in a direction protruding from the substrate SUB (e.g., a vertical Z-axis direction). Each of the memory cell strings ST may include memory cells MC, a source selection transistor SST, and a ground selection transistor GST. The source selection transistors SST may be connected to source selection lines SSL<0> through SSL<3> extending in a column (Y-axis) direction and thus may be controlled, and the ground selection transistors GST may be connected to ground selection lines GSL extending in both row (X-axis) and column (Y-axis) directions and thus may be controlled.

The wordlines WL<0> through WL<3> are arrayed in a Z-axis direction perpendicular to the substrate SUB. The wordlines WL<0> through WL<3> are located respectively at layers where memory cells MC of each of the memory cell strings ST exist. Each of the wordlines WL<0> through WL<3> are combined with memory cells MC that are arrayed as a matrix in the X and Y axes directions on the substrate SUB. The bitlines BL<0> through BL<3> may be connected to the memory cell strings ST that are arrayed in the row (X-axis) direction. The memory cells MC, the source selection transistor SST, and the ground selection transistor GST in each of the memory cell strings ST may share the same channel. The channel may extend in the Z-axis direction that is perpendicular to the substrate SUB.

A program operation and/or a verification operation may be controlled to be performed on the memory cells MC by applying, by the control logic 420 of FIG. 2, an appropriate voltage to the wordlines WL<0> through WL<3> and the bitlines BL<0> through BL<3>. For example, when a set voltage is applied to source selection lines SSL<0> through SSL<3> connected to the source selection transistor SST, and the bitlines BL<0> through BL<3>, a random memory cell string ST may be selected, and when a set voltage is applied to the wordlines WL<0> through WL<3>, and a random memory cell MC of the selected memory cell string ST is selected, a read operation, a program operation, and/or a verification operation may be performed on the selected memory cell MC.

Figure 16:
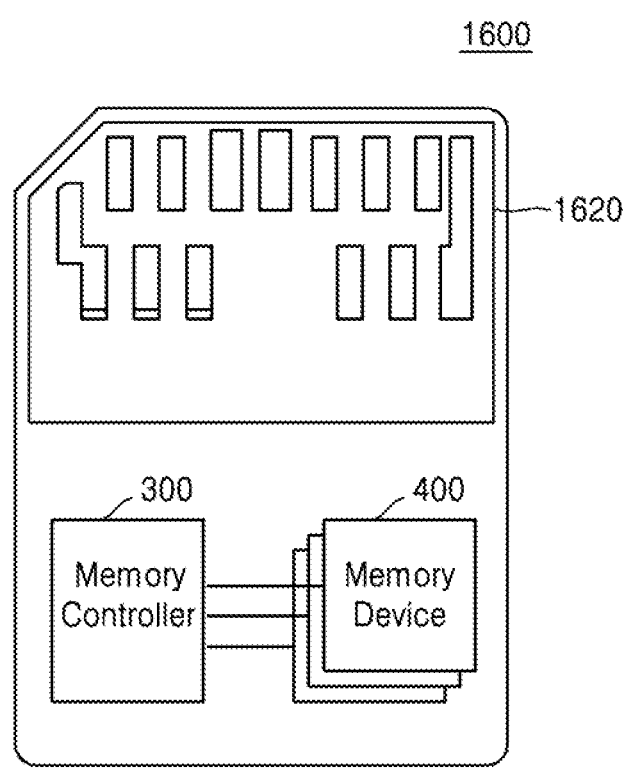
FIG. 16 illustrates a memory card according to an exemplary embodiment of the inventive concept.

FIG. 16 illustrates a memory card 1600 according to an exemplary embodiment of the inventive concept. The memory card 1600 may be a portable storage device that is usable by being connected to an electronic device such as a mobile device or a desktop computer. As illustrated in FIG. 16, the memory card 1600 may include a memory controller 300, a memory device 400, and a port area 1620. The memory card 1600 may communicate with an external host (not shown) via the port area 1620, and the memory controller 300 may control the memory device 400. The memory controller 300 and the memory device 400 of FIG. 16 may correspond to the memory controller 300 and the memory device 400 of FIG. 2.

Figure 17:
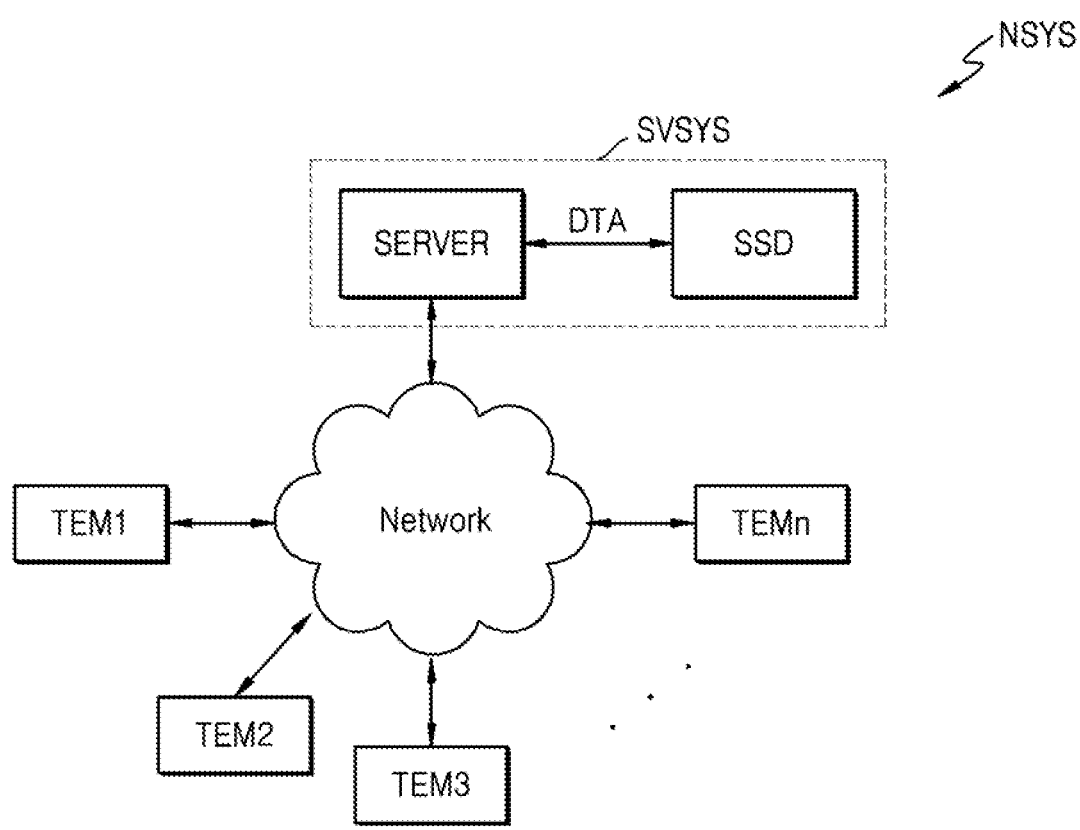
FIG. 17 illustrates a network system including a server system including a solid state drive (SSD) of FIG. 3, according to an exemplary embodiment of the inventive concept.

FIG. 17 illustrates a network system NSYS including a server system SVSYS including the SSD of FIG. 3, according to an exemplary embodiment of the inventive concept. Referring to FIG. 17, the network system NSYS may include the server system SVSYS and a plurality of terminals TEM1 through TEMn that are connected via a network. The server system SVSYS may include a server that processes requests from the plurality of terminals TEM1 through TEMn connected via the network, and the SSD that stores a plurality of pieces of data corresponding to the requests from the plurality of terminals TEM1 through TEMn. Thus, in the present embodiment, the network system NSYS and the server system SVSYS may reliably perform authentication between a controller and a memory of the SSD, and thus may achieve reliability of the network system NSYS.

The inventive concept has been particularly shown and described with reference to exemplary embodiments thereof. However, the inventive concept may, however, be embodied in many different forms and should not be construed as being limited to the embodiments set forth herein. For example, in the embodiments, the memory device is a flash memory device, but the memory device is not limited thereto and thus may be a non-volatile memory device other than the flash memory device. Thus, it will be understood by those of ordinary skill in the art that various changes in form and details may be made therein without departing from the spirit and scope of the following claims.

What is claimed is:

1. An operating method of a memory system, the operating method comprising:
    transmitting an authentication request to a memory device using a memory controller;
    converting the authentication request to a first address corresponding to a data area using the memory device, wherein the authentication request comprises request to access the data area for processing authentication data that indicate a physical characteristic of the memory device;
    processing the authentication data that corresponds to the first address and transmitting the authentication data as an authentication response to the authentication request to the memory controller using the memory device;
    verifying whether the authentication response received from the memory device is an authentication response to the authentication request using the memory controller; and
    when it is verified that the authentication response is the authentication response to the authentication request, permitting normal access to the memory device, wherein the permitting of the normal access comprises encrypting a second address for the normal access to the memory device using the memory controller, decrypting the encrypted second address using the memory controller, and performing a normal operation on the decrypted second address using the memory device.

2. The operating method of claim 1, wherein the verifying comprises:
    converting the authentication request to the first address using the memory controller; and
    comparing set data that is set for the first address with the authentication data that is extracted from the authentication response transmitted from the memory device using the memory controller.

3. The operating method of claim 2, wherein each of the memory controller and the memory device converts the authentication request to the first address using an address generator that equally generates the first address with respect to the authentication request.

4. The operating method of claim 1, wherein the verifying comprises:
    searching for the first address that is mapped to the authentication request using the memory controller; and
    comparing set data that is set for the first address with the authentication data that is extracted from the authentication response transmitted from the memory device using the memory controller.

5. The operating method of claim 1, further comprising, between the processing and the transmitting, encrypting the authentication data and generating the encrypted authentication data as the authentication response.

6. The operating method of claim 1, further comprising:
exchanging a Number Used Once (nonce) between the memory controller and the memory device; and
setting the authentication request that corresponds to the nonce using the memory controller.

7. The operating method of claim 1, wherein each of the encrypting and the decrypting is performed using the authentication response as a secret key.

8. The operating method of claim 1, wherein the memory device comprises a NAND flash memory device.

9. The operating method of claim 1, wherein the memory system comprises a solid state drive (SSD).

10. The operating method of claim 1, wherein the memory device converts the authentication request to the first address corresponding to size to the authentication data.

11. An operating method of a memory system, the operating method comprising:
exchanging a Number Used Once (nonce) between a memory controller and a memory device;
generating a challenge using the nonce by each of the memory controller and the memory device;
converting the challenge to a first address corresponding to a data area using the memory device, wherein the authentication request comprises request to access the data area for processing authentication data that indicate a physical characteristic of the memory device;
reading the authentication data that corresponds to the first address using the memory device;
transmitting a response corresponding to the challenge to the memory device using the memory controller;
comparing the authentication data with the response received from the memory controller and verifying whether the response received from the memory controller is a response that forms a challenge-response pair with the challenge using the memory device; and
when the response received from the memory controller is the response that forms the challenge-response pair with the challenge, permitting normal access to the memory device, wherein the permitting of normal access comprises encrypting a second address for the normal access to the memory device using the memory controller and using the response as a secret key, decrypting the encrypted second address using the response as a secret key and using the memory device, and performing a normal operation on the decrypted second address using the memory device.

12. The operating method of claim 11, wherein the transmitting comprises: searching for the response that is mapped to the challenge using the memory controller; and transmitting the response to the memory device.

13. A memory system, comprising:
a memory controller configured to transmit an authentication request;
a memory device configured to:
convert the authentication request to a first address corresponding to a data area using the memory device, wherein the authentication request comprises request to access the data area for processing authentication data that indicate a physical characteristic of the memory device,
process the authentication data, the authentication data corresponding to the first address, and
transmit the authentication data as an authentication response to the authentication request to the memory controller, wherein the memory controller is configured to generate set data setting for a first address converted from the authentication request, extract the authentication data from the authentication response transmitted from the memory device, and verify whether the authentication response received from the memory device is an authentication response to the authentication request by comparing the set data with the authentication data;
the memory controller is further configured to encrypt a second address for normal access to the memory device using the authentication response as a secret key, when it is verified that the authentication response is the authentication response to the authentication request; and
the memory device is further configured to decrypt the encrypted second address using the authentication response as the secret key and perform the normal operation on the decrypted second address.

14. The memory system of claim 13, wherein each of the memory controller and the memory device comprise an address generator that equally generates the first address with respect to the authentication request.

15. The memory system of claim 13, wherein the memory system comprises a solid state drive (SSD).

* * * * *